United States Patent [19]
Hall

[11] Patent Number: 5,898,291
[45] Date of Patent: Apr. 27, 1999

[54] BATTERY CELL BYPASS TOPOLOGY

[75] Inventor: John C. Hall, Saratoga, Calif.

[73] Assignee: Space Systems/Loral, Inc., Palo Alto, Calif.

[21] Appl. No.: 09/013,500

[22] Filed: Jan. 26, 1998

[51] Int. Cl.$^6$ ....................................................... H02J 7/00
[52] U.S. Cl. .......................... 320/121; 320/118; 320/136; 320/120; 320/122; 429/61
[58] Field of Search ...................................... 320/116, 117, 320/118, 119, 120, 121, 122, 123, 135, 136; 429/61

[56] References Cited

U.S. PATENT DOCUMENTS

| | | | |
|---|---|---|---|
| 4,287,267 | 9/1981 | Whittlesey et al. | 429/61 |
| 4,502,000 | 2/1985 | Mashikian | 320/122 |
| 4,616,170 | 10/1986 | Ursoger | 320/119 |
| 5,744,936 | 4/1998 | Kawakami | 320/120 |
| 5,773,962 | 6/1998 | Nor | 320/116 |

*Primary Examiner*—Robert E. Nappi
*Assistant Examiner*—K. Shin
*Attorney, Agent, or Firm*—Perman & Green, LLP

[57] ABSTRACT

When the cell of a battery, most notably a lithium ion battery, fails and human intervention is unavailable to correct the problem. a system is provided for optimizing the energy storage capacity of the battery. At least two cellular strings, each including a plurality of battery cells, are connected electrically in series. All cellular strings contain the same number of battery cells and are electrically connected in parallel to form a battery array powering a load. A sensor detects the condition of each battery cell and sends a signal of the detected condition to a controller for operating the battery array for powering the load. A switching arrangement is responsive to the sensor, upon failure of a battery cell in one cellular string, for disconnecting at least one other battery cell of the battery array such that, thereafter, the modified battery array continues to power the load with reduced but optimized capacity. In one instance, the switching arrangement is operable, upon failure of the battery cell in one cellular string to disconnect that cellular string from the remaining cellular strings which, thereafter, alone continue to power the load. In another instance, the switching arrangement is operable, upon failure of the battery cell in one cellular string, to disconnect a battery cell from each of the remaining cellular strings whereby all of the cellular strings continue, as originally, to have an equal, albeit reduced, number of active battery cells, the modified battery array continuing to power the load.

12 Claims, 2 Drawing Sheets

BATTERY CELL BYPASS TOPOLOGY

BACKGROUND OF THE INVENTION

1. Field of the Invention

The present invention relates generally to batteries for spacecraft applications and, more particularly, to a system for minimizing the impact of a failed battery cell achieved by operating on the battery circuit so as to optimize the usable battery energy storage capacity after the failure occurs.

2. Description of the Prior Art

The effect of a failed cell on the capacity of the remainder of the cells may also be minimized by using a large number of battery cells connected in parallel with fuse protection. Such a technique is presented in commonly assigned co-pending U.S. application Ser. No. 08/955,931 assigned to Space Systems/Loral, Inc., Docket No. PA-96090 entitled "Massively Parallel Spacecraft Battery Cell Module Design".

A key point to be considered is that for a lithium ion battery in a series-parallel array, a failed cell in one series string of battery cells of the array undesirably reduces the allowed charging voltage of the remaining series strings of the array and thereby reduces their capacity. This invention avoids such an undesirable result by sacrificially removing cells from all series strings of the array.

By way of example, for a 100 V lithium ion battery, the invention leads to a 4% capacity loss if one cell fails. Operating all arrays at a depressed voltage leads to a 50% loss while removing the effected string results in a more moderate 25% loss.

As background, it must be appreciated that spacecraft reliability requirements entail that no function on the satellite can be vulnerable to the failure of a single component. Typically, this requirement is satisfied by having multiple redundant components for each function. For batteries, the requirement is satisfied today by including an additional cell in each series string. All battery cells in the string are equipped with bypass electronic components (e. g. diodes or switches). In the event that a battery cell fails or short circuits, the battery operates with a one cell capacity reduction for which it was originally sized. In the event that the cell fails, open circuit current continues to be passed through the series string by way of the bypass circuitry.

While the invention is generally applicable to all styles of batteries, the situation with lithium ion batteries is somewhat unique in that they are not presently available in cells of sufficient size to meet the requirements of advanced high power satellites with single series string designs. Even if such lithium ion battery cells of appropriate size were available, reengineering of cells to match capacity requirements is not a desirable exercise. These factors make the use of smaller building block cells in a series-parallel combination attractive.

Two possible approaches for arranging building block cells are illustrated in FIG. 1. In a parallel-series array 20, as illustrated, individual cells 22 are connected first in parallel to form a cell module 24 and then in series along a lead 26 to form a high voltage battery unit. In a series-parallel array 28 as seen in FIG. 2, series strings 30, 32, and 34 of cells 36 are connected in parallel.

The parallel-series array 20 is electrically identical to commonly employed present satellite battery practice and similar bypass strategies may be employed. The series-parallel array presents a different problem owing to the narrow cell voltage range (illustrated in FIG. 3) over which charging occurs for a lithium ion cell and the high individual cell voltage of a lithium ion type battery. Referring to FIG. 3, it is seen that approximately half the capacity (from approximately 600 mAh to 1200+ mAh) is charged into the cell as the voltage increases. from 4.1 to 4.2 V. For a 25 cell battery, this corresponds to a voltage change of 2.5 V.

In a 25 cell series string, if one cell fails, its string charging voltage is reduced by 4.2 V/25=0.17 V. per cell.

Based on FIG. 3, this operation reduces the capacity of the parallel-series strings from 1250 mAh to 300 mAh, a 75% reduction. In addition, it creates an instability in the battery system as the string with the failed cell will have 4 times the coulombic capacity as compared to the parallel strings with no failed cells. Potential solutions to this problem are:

bypass the entire series string; unless the number of strings exceeds the number of cells per string, however, this is a bad trade; for example a 10 kW, 100 V, 73% DOD ("depth of discharge") satellite battery built with 60 Ah cells requires three 24 cell series strings to meet the capacity requirements; single point failure invulnerability requires an additional series string which is a 33% overbuild of the battery;

individually regulate the voltage on each string; even for a regulated bus, this is an unattractive option as component redundancy requirements in the regulator will adversely increase mass in a distributed system; it also precludes an unregulated bus which is gravimetrically superior to the regulated bus.

It was with knowledge of the foregoing that the present invention has been conceived and is now reduced to practice.

SUMMARY OF THE INVENTION

When the cell of a battery, most notably a lithium ion battery, fails and human intervention is unavailable to correct the problem. A system is provided for optimizing the energy storage capacity of the battery. At least two cellular strings, each including a plurality of battery cells, are connected electrically in series. All cellular strings contain the same number of battery cells and are electrically connected in parallel to form a battery array powering a load. A sensor detects the condition of each battery cell and sends a signal of the detected condition to a controller for operating the battery array for powering the load. A switching arrangement is responsive to the sensor, upon failure of a battery cell in one cellular string, for disconnecting at least one other battery cell of the battery array such that, thereafter, the modified battery array continues to power the load with reduced but optimized capacity. In one instance, the switching arrangement is operable, upon failure of the battery cell in one cellular string to disconnect that cellular string from the remaining cellular strings which, thereafter, alone continue to power the load. In another instance, the switching arrangement is operable, upon failure of the battery cell in one cellular string, to disconnect a battery cell from each of the remaining cellular strings whereby all of the cellular strings continue, as originally, to have an equal, albeit reduced, number of active battery cells, the modified battery array continuing to power the load.

A primary feature of the invention, then, is to provide a system for minimizing the impact of a failed battery cell achieved by operating on the battery circuit so as to optimize the usable battery energy storage capacity after the failure occurs.

Another feature of the invention is to provide such a technique according to which additional cells of the battery are sacrificed when a single cell fails to thereby minimize capacity loss.

Still another feature of the invention is to provide such a technique according to which, upon failure of a cell in a string of cells, the entire string of cells is removed from the array to thereby minimize loss of capacity.

A further feature of the invention is to provide such a technique according to which, upon failure of a cell in a string of cells, one cell is removed from each of the other strings of the array to thereby minimize loss of capacity.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 4:
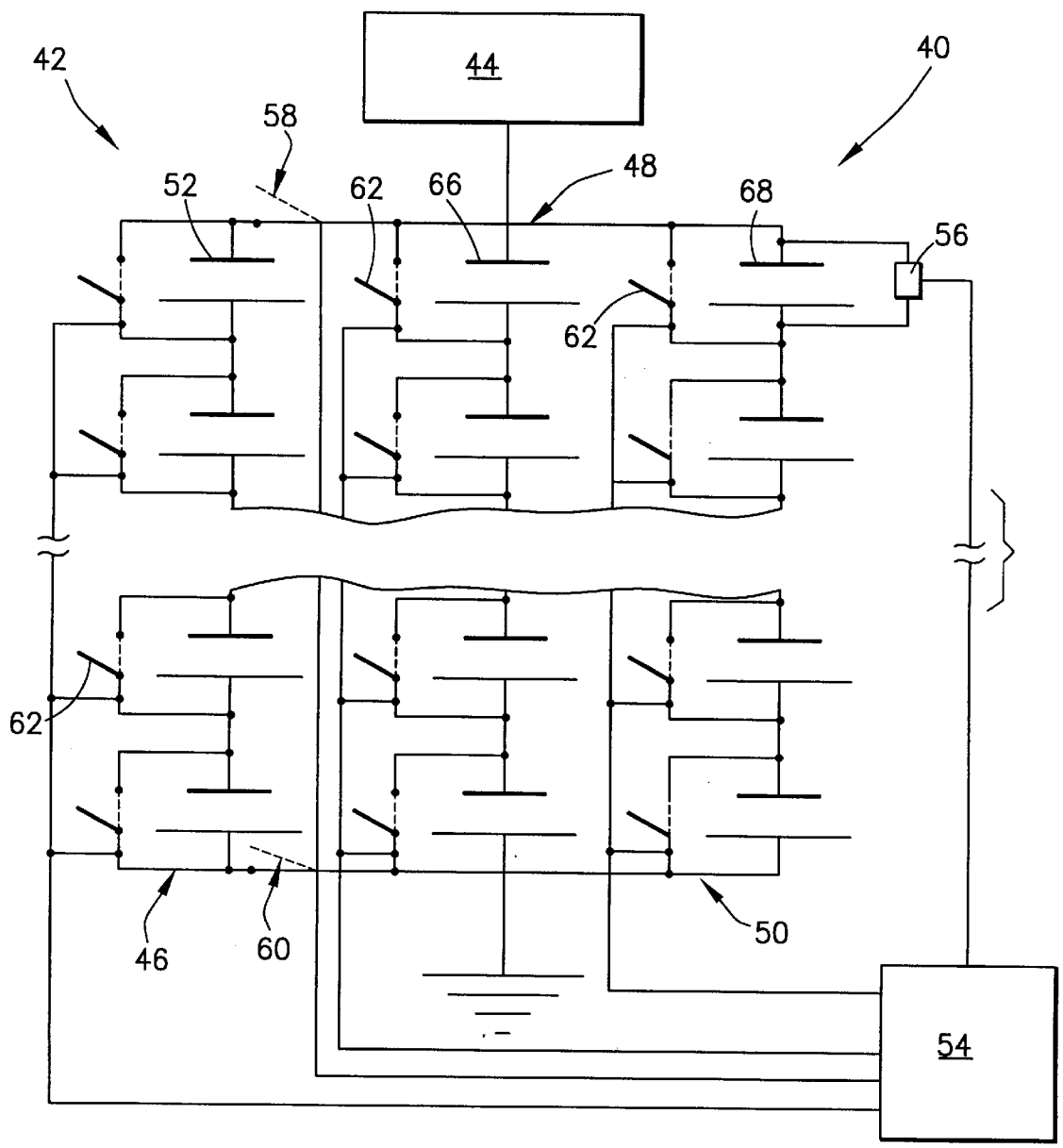
FIG. 4 is an electrical schematic diagram, abbreviated, illustrating a battery array embodying the invention utilizing a series-parallel battery architecture.

Turn now to the drawings and, initially, to FIG. 4 which schematically illustrates a system 40 embodying the invention for optimizing the energy storage capacity of a battery depicted as a battery array 42. While the invention may be applied to all types of batteries, it is particularly desirable for use with lithium ion batteries because of the narrow range of charging voltage which they employ and also because, when overcharged, lithium ion batteries can be seriously damaged and may themselves become destructive of their surroundings.

As seen in FIG. 4, the battery array 42 is intended to power a load 44. In a typical construction but not one to be taken as limiting the invention, the battery array 42 is illustrated as including three cellular strings 46, 48, and. 50, each including a plurality, for example, 25 in number, of individual battery cells 52 connected electrically in series. Each of the cellular strings 46, 48, 50 contains the same number of said battery cells, four being illustrated, but 25 battery cells considered to be present in each cellular string for purposes of discussion here. The actual number of battery cells, however, is irrelevant for purposes of the invention. The cellular strings 46, 48, and 50 are being electrically connected in parallel to form the battery array 42 such that, together, they all power the load 44 under the direction of a suitable controller 54. The controller may be a computer with the requisite intelligence and memory for operating the system 40.

A suitable sensor 56 for measuring voltage or current, for example, is connected across each battery cell 52 (only one being shown for simplicity) for detecting the condition of each of the battery cells 52 in all of the cellular strings 46, 48, 50 and for sending a signal of the detected condition to the controller 54. For example, the sensor 56 may include a voltmeter arranged to inform the controller 54 when the battery cell no longer generates an electromotive force. Thereupon, a switch mechanism, responsive to the sensor 56, upon failure of a battery cell 52 in one of the cellular strings is operated through the controller 54 for disconnecting cells in each of the other series strings of the battery array 42 to thereby form a modified battery array such that, thereafter, the modified battery array continues to power the load with reduced but optimized capacity.

Alternatively illustrated in FIG. 4, a switch mechanism 58, 60 is operable, upon failure of a battery cell 52 in the cellular string 46, to disconnect that cellular string from its associated cellular strings 48 and 50 such that, thereafter, only the cellular strings 48, 50 continue to power the load 44. For such an event to occur, the switch mechanism 58, 60 is operational upon a signal from the sensor 56 acting through the controller 54.

It will be appreciated from the preceding discussion that the options in event of a cell failure are:

(a) take no action in which event 75% of capacity of the battery array 42 will have been lost; or (b) eliminate the cellular string 46 in which event 33% of capacity of the battery array 42 will have been lost, as just described; or (c) eliminate one battery cell in each cellular string 46, 48, 50 in which event for a 25 cell series string, 4% of capacity of the battery array 42 will have been lost but with the understanding that with additional battery cells in the cellular strings, this percentage can be significantly reduced; this is the preferred mode of operation.

Figure 1:
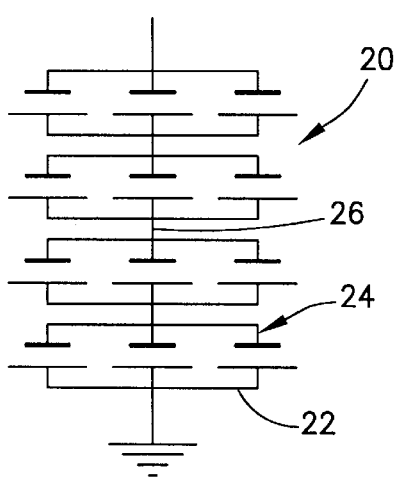
FIG. 1 is a detail schematic diagram illustrating a parallel-series array of battery cells.
Figure 2:
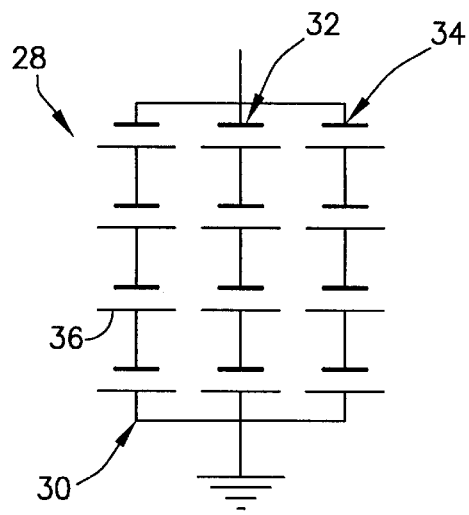
FIG. 2 is a detail schematic diagram illustrating a series-parallel array of battery cells.
Figure 3:
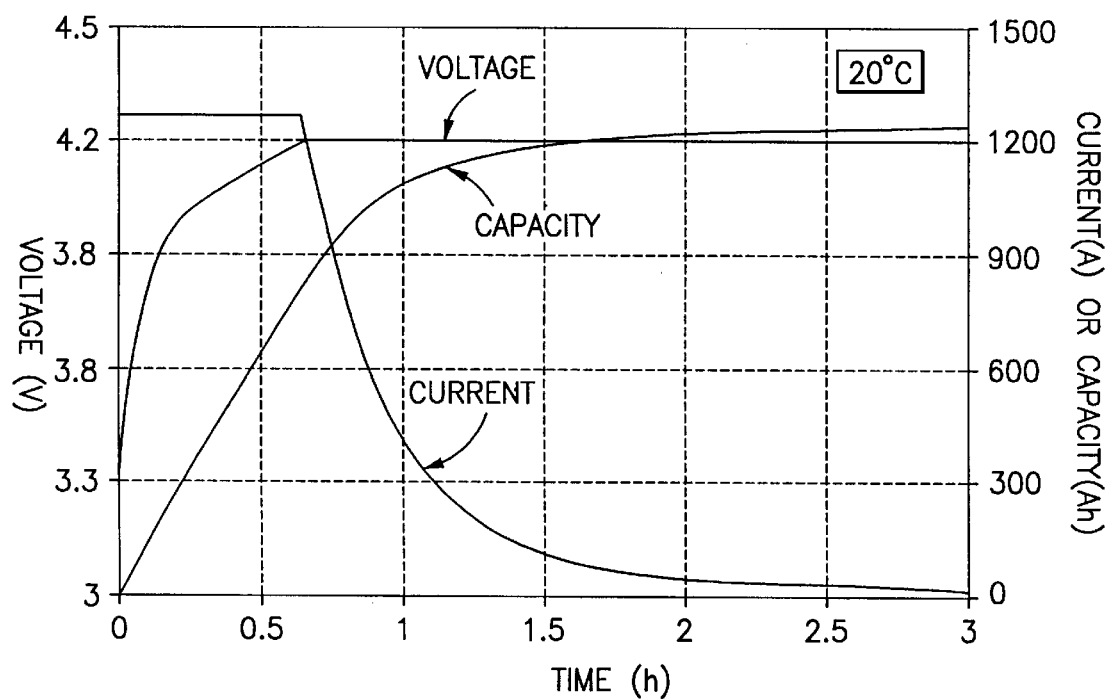
FIG. 3 is a graph depicting, over time, the charging characteristics of a lithium ion battery cell, including the values of voltage, current, and capacity.

As to (a), the 75% of capacity lost may be calculated as follows:

because the cellular string 46 has lost one of its 25 battery cells, its charging voltage is reduced by 4%, or 0.17 V from its nominal level of 4.2 V to 4.03 V; viewing FIG. 3, 4.03 V on the voltage curve occurs at about 0.25 hours charging time at which the capacity is about 300 Ah or 25% vice 1200+ Ah for full capacity at three hours charging time.

As to (b), the 33% of capacity loss is due to elimination of one-third of the battery by disconnection of the series string:

As to (c), the 4% of capacity lost may be calculated as follows:

because each of the cellular strings 46, 48, 50 has lost one of its 25 battery cells, this represents only a 4% loss of capacity for the battery array.

In another instance, reflecting option (c) above, also illustrated in FIG. 4, individual switches 62 in each of the cellular strings 48, 50 are operable, upon failure of the battery cell 52 in the cellular string 46, to disconnect a second battery cell 66, 68 from each of the cellular strings 48, 50, respectively. In this manner, all of the cellular strings 46, 48, 50 continue, as originally, to have an equal number of active battery cells and now define a modified battery array such that, thereafter, the modified battery array continues to power the load 44. Of course, should battery cell 66 fail, individual switches 62 in each of the cellular strings 46, 50 are operable to disconnect a second battery cell 52, 68 from each of the cellular strings 48, 50, respectively. Also, should battery cell 68 fail, individual switches 62 in each of the cellular strings 46, 48 are operable to disconnect a second battery cell 52, 66 from each of the cellular strings 46, 48, respectively.

Thus, the "pruning" solution of the invention is to command bypass switches on the "good" cellular strings which reduce their series cell count by one such that all cellular strings are once again equal. In effect, battery capacity is increased by voluntarily discarding battery cells. This concept has been illustrated in FIG. 4 and it was earlier noted that each battery cell is equipped with a bypass switch 62. Prior art cannot be safely practiced on lithium ion batteries because of the required voltage swing, diodes not being an option in this instance. In the "pruning" concept of the invention, the switches are remotely commanded. If a fault is noted in one cellular string (having a battery cell which is either short or open), the battery array 42 is taken to a low state of charge and cells "pruned" from the unaffected series strings via the commandable switches. The result is that on a 3×25 battery array, a loss of 4% capacity occurs (assuming one cell lost in each of a plurality of 25 cell cellular strings) when 1% of the capacity (a cell) fails. It requires a 4% battery overbuild as opposed to a 25% battery overbuild and yields a 4% capacity loss vs 25% to 75% for the alternate approaches.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of optimizing the energy storage capacity of a battery powering a load comprising the steps of:
    (a) electrically connecting a plurality of battery cells in series to form a first and at least a second cellular string, all of the cellular strings containing the same number of battery cells;
    (b) electrically connecting the cellular strings in parallel to form a battery array such that, together, the cellular strings power the load; and
    (c) sensing the condition of each of the battery cells in the first and second cellular strings;
    (d) upon failure of a first battery cell in one cellular string as determined in step (c), disconnecting at least a battery cell in each of the other series strings of the battery array to form a modified battery array such that, thereafter, the modified battery array continues to power the load with reduced but optimized capacity.

2. A method as set forth in claim 1 wherein step (d) includes the step of:
    (e) upon failure of a battery cell in a cellular string, disconnecting the cellular string from the battery array such that, thereafter, only the remaining cellular strings continue to power the load.

3. A method as set forth in claim 1 wherein step (d) includes the step of:
    (e) upon failure of a battery cell in a cellular string, disconnecting battery cells from the remaining cellular strings whereby the cellular strings continue, as originally, to have an equal number of active battery cells and define a modified battery array such that, thereafter, the modified battery array continues to power the load.

4. A method as set forth in claim 1 wherein the battery is a lithium ion battery.

5. A system for optimizing the energy storage capacity of a battery powering a load comprising:
    a first cellular string including a plurality of battery cells connected electrically in series;
    at least a second cellular string including a plurality of battery cells connected electrically in series;
    each of said first and second cellular strings containing the same number of said battery cells;
    said first and second cellular strings being electrically connected in parallel to form a battery array such that, together, said first and second cellular strings power the load;
    sensing means for detecting the condition of each of said battery cells in said first and second cellular strings; and
    switch means responsive to said sensing means upon failure of a first battery cell in said first cellular string for disconnecting at least a second battery cell of said battery array to thereby form a modified battery array such that, thereafter, said modified battery array continues to power the load with reduced but optimized capacity.

6. A system as set forth in claim 5 wherein said switch means is operable, upon failure of the battery cell in said first cellular string to disconnect said first cellular string from said second cellular string such that, thereafter, only said second cellular string continues to power the load.

7. A system as set forth in claim 5 wherein said switch means is operable, upon failure of the battery cell in said first cellular string, to disconnect a second battery cell from said second cellular string whereby said first and second cellular strings continue, as originally, to have an equal number of active battery cells and define a modified battery array such that, thereafter, said modified battery array continues to power the load.

8. A system as set forth in claim 5 wherein the battery is a lithium ion battery.

9. A system for optimizing the energy storage capacity of a battery comprising:
    a load to be powered;
    a first cellular string including a plurality of battery cells connected electrically in series;
    at least a second cellular string including a plurality of battery cells connected electrically in series;
    each of said first and second cellular strings containing the same number of said battery cells;
    said first and second cellular strings being electrically connected in parallel to form a battery array such that, together, said first and second cellular strings power said load;
    controller means for operating said battery array to power said load;
    sensing means for detecting the condition of each of said battery cells in said first and second cellular string and for sending a signal of the detected condition to said controller means; and
    switch means responsive to said sensing means upon failure of a first battery cell in said first cellular string for disconnecting at least a second battery cell of said battery array to thereby form a modified battery array such that, thereafter, said modified battery array continues to power the load with reduced but optimized capacity.

10. A system as set forth in claim 9 wherein said switch means is operable, upon failure of the battery cell in said first cellular string to disconnect said first cellular string from said second cellular string such that, thereafter, only said second cellular string continues to power the load.

11. A system as set forth in claim 9 wherein said switch means is operable, upon failure of the battery cell in said first cellular string, to disconnect a second battery cell from said second cellular string whereby said first and second cellular strings continue, as originally, to have an equal number of active battery cells and define a modified battery array such that, thereafter, said modified battery array continues to power the load.

12. A system as set forth in claim 9 wherein the battery is a lithium ion battery.

* * * * *